Nov. 8, 1932.   W. M. EVANS ET AL   1,886,537
SELECTIVE POWER TRANSMISSION
Filed Feb. 4, 1932   2 Sheets-Sheet 1
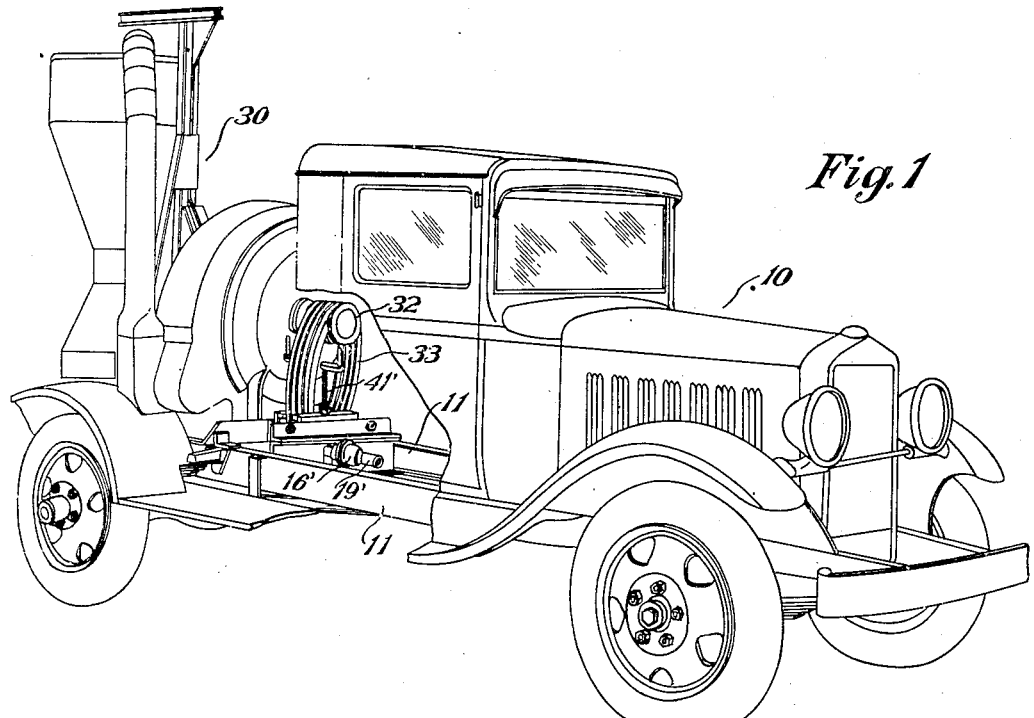
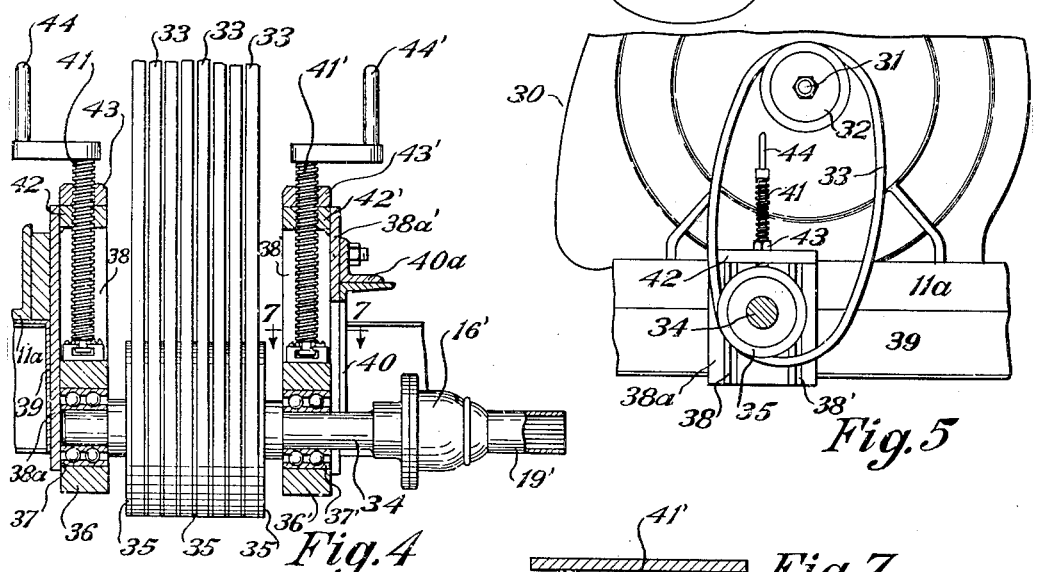
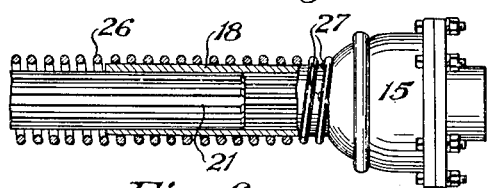
Inventors
W. M. Evans
G. Evans
By Frease and Bishop
Attorneys

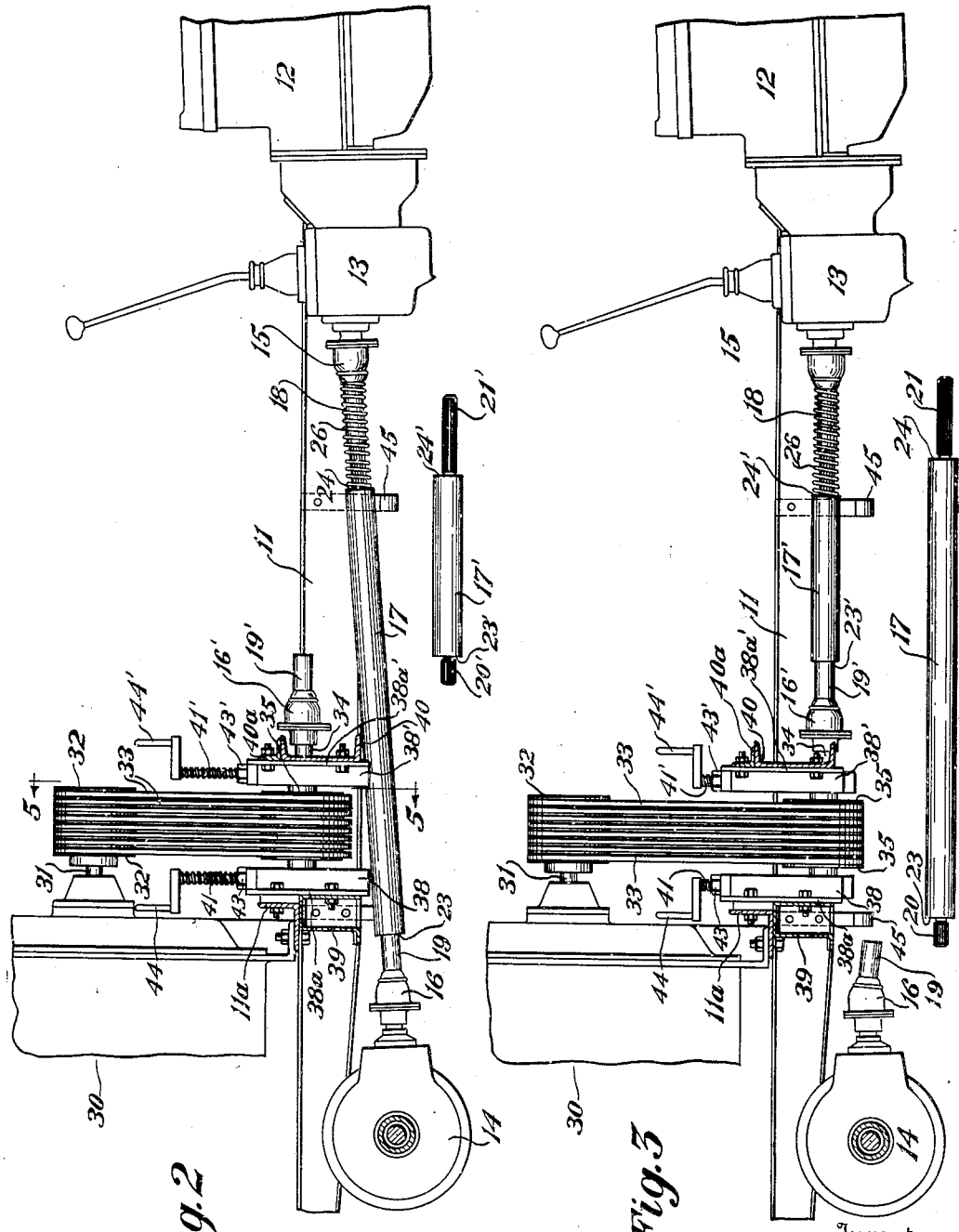

Patented Nov. 8, 1932

1,886,537

UNITED STATES PATENT OFFICE

WILLIAM M. EVANS AND GRAYDON EVANS, OF NEAR EAST SPARTA, OHIO

SELECTIVE POWER TRANSMISSION

Application filed February 4, 1932. Serial No. 590,916.

The invention relates to power transmission for motor vehicles, and more particularly to power transmission for selectively driving the vehicle or another apparatus.

In prior constructions of this general type, the change over from driving the vehicle to driving the other apparatus requires the use of tools and involves considerable time and labor. Also difficulty is had in securing proper alignment between the power transmitting mechanism of the vehicle and the driven machine.

Accordingly, it is an object of the present invention to provide a power transmitting member for a vehicle, which may be quickly and easily disconnected or attached without the use of tools.

Another object is to provide means for adjusting the driving connections of the driven apparatus so as to readily align said connections with the power mechanism of the vehicle without the use of tools.

A further object is to provide an auxiliary power transmission member, which may be quickly and easily substituted for the normal power transmission member of the vehicle to effect a driving connection between the power mechanism and the driven machine without the use of tools.

These and other objects are attained by the improvements comprising the present invention, which may be stated in general terms as including a motor vehicle having power transmitting means, a drive shaft provided with longitudinally slidable splined coupling means adapted for quick detachable connection to the power transmitting means, a power driven apparatus associated with the vehicle, driving connections for said apparatus, means aligning the driving connections with the power transmitting means, an auxiliary drive shaft provided with longitudinally slidable splined coupling means adapted for quick detachable connection to the driving connections of the driven apparatus and the power transmitting means of the vehicle, and spring means for holding either shaft against longitudinal movement.

In the drawings forming part hereof Figure 1 is a perspective view of a motor vehicle having a grinding mill mounted thereon, parts being broken away to show the driving connections of the grinding mill;

Fig. 2 is a fragmentary sectional view of the vehicle, showing the driving connections between the engine and the differential, and the auxiliary drive shaft detached;

Fig. 3 is a view similar to Fig. 2 showing the engine and grinding mill operatively connected by the auxiliary drive shaft and the usual drive shaft detached;

Fig. 4 is a fragmentary axial sectional view of the improved adjustable driving connections of the grinding mill;

Fig. 5 is a fragmentary sectional view taken on line 5—5, Fig. 2;

Fig. 6 is an enlarged fragmentary sectional view of the improved coupling means between the drive shaft and the front universal joint of the power transmitting means;

Fig. 7 is a fragmentary plan sectional view as on line 7—7, Fig. 4.

Similar numerals refer to similar parts throughout the drawings.

A standard type of motor vehicle is indicated generally at 10 and includes a frame having longitudinal side channel members 11, the engine 12, transmission 13 and differential 14. A universal joint 15 is operatively connected to the transmission 13, and a universal joint 16 is operatively connected to the differential 14 in the usual manner.

For transporting the vehicle, a drive shaft 17 is operatively connected between the universal joints 15 and 16 as shown in Fig. 2. Coupling means for providing a detachable longitudinally slidable drive connection between the ends of the drive shaft 17 and the universal joints 15 and 16, may include an internally splined sleeve 18 operatively connected to the universal joint 15 and an internally splined sleeve 19 operatively connected to the universal joint 16. Preferably, the drive shaft 17 is provided at one end with a splined portion 20 of reduced diameter forming the shoulder 23, and at its other end with a relatively long splined portion 21 of reduced diameter forming the shoulder 24. The splined portion 20 is adapted for meshing with sleeve 19, and the splined portion 21 is adapted for meshing with sleeve 18.

The splined sleeve 18 preferably has sufficient length to permit longitudinal sliding movement therein of the splined portion 21 of the shaft 17 in a direction away from the sleeve 19 so as to disengage the splined portion 20 from the sleeve 19, after which the shaft may be slid in the opposite direction to disengage portion 21 from sleeve 18.

Means for holding the drive shaft 17 against longitudinal sliding movement and the shoulder 23 in abutment with sleeve 19 when the shaft is in driving engagement with sleeves 18 and 19, preferably includes a coil compression spring 26 located around the sleeve 18 and having one end normally abutting the shoulder 24 and the other end secured to the universal joint 15 or to the sleeve 18 adjacent the universal joint as by welding as indicated at 27.

By grasping the shaft 17 and moving it longitudinally to the right as viewed in Fig. 2, to compress the spring 26, the drive shaft 17 may be quickly and easily detached from the splined sleeve 19 and then from sleeve 18 by moving the shaft to the left, without the use of any tools whatsoever.

In the drawings, we have shown a grinding mill mounted upon the vehicle frame, but it is to be understood that any power driven apparatus may be mounted on the frame or otherwise associaed with the vehicle, without departing from the scope of our invention, as defined in the appended claims.

The grinding mill is indicated generally at 30 and is supported upon suitable cross members extending between the frame members 11, one such cross member being indicated at 11a. The driven shaft of the mill is indicated at 31 and may have mounted thereon a series of V pulleys 32 driven by V belts 33 as shown, or any other well known driving means comprising pulley members and flexible belt members.

The driving connections for the mill 30 preferably include a counter shaft 34 provided with V pulleys 35 for driving the V belts 33. Means for adjustably supporting the counter shaft 34 preferably include the bearing blocks 36 and 36', which carry ball bearings 37 and 37' in which the shaft 34 is journaled.

The bearing blocks 36 and 36' are slidably mounted in tapered guides 38 and 38' extending angularly from upright plates 38a and 38a' respectively, the plate 38a being secured to cross member 11a and to a transverse supporting member 39 extending between the side frame members 11, and the plate 38a' being secured to a transverse supporting member 40 extending between guide members 11 and to an angle member 40a carried thereby. Means for raising and lowering the counter shaft 34 relative to the driven shaft 31 of the mill to align the shaft 34 with the power transmitting means, may include screws 41 and 41' rotatably connected at their lower ends to bearing blocks 36 and 36' and threaded through angular members 42 and 42', which project from the upper ends of the plates 38a and 38a' respectively. Lock nuts 43 and 43' may be provided upon the screws above the projecting members 42 and 42', respectively, for holding the counter shaft 34 in any adjusted position. Means for rotating the screws 41 and 41' may include crank handles 44 and 44' respectively.

By manipulating the crank handles 44 and 44', the counter shaft 34 may be moved into substantial alignment with the power transmitting means of the vehicle, as shown in Fig. 3.

For driving the grinding mill, an auxiliary shaft 17' is preferably provided, and the shaft 17' is provided at its ends with splined portions 20' and 21' similar to portions 20 and 21 respectively of shaft 17, forming shoulders 23' and 24' respectively. The counter shaft 34 is provided with a universal joint 16' and a splined sleeve 19' operatively connected thereto, and the universal joint 16' and sleeve 19' are preferably identical with the universal joint 16 and sleeve 19 respectively.

The splined portion 20' of the auxiliary drive shaft 17' is adapted to slidably mesh with the splined sleeve 19', and the splined portion 21' is adapted to slidably mesh with the splined sleeve 18. The shaft 17' may be detachably connected to the sleeve 18 by meshing splined portion 21' with sleeve 18, and then by forcing the shaft to the right as viewed in Fig. 3 so that the spring 26 is compressed by abutment with shoulder 24', the splined portion 20' may be meshed with sleeve 19' without the use of any tools, and the spring will hold the shaft 17' against longitudinal movement.

When the grinding mill 30 is operatively connected to the power transmitting means of the vehicle, as shown in Fig. 3, by moving the auxiliary shaft 17' to the right against the action of the spring 26, the shaft may be quickly and easily disengaged from the splined sleeves 19' and 18 in the same manner as shaft 17 is detached, without the use of any tools whatsoever.

In the operation of the improved apparatus, assuming the differential 14 of the vehicle is operatively connected to the power transmitting means of the vehicle, as shown in Fig. 2; if it is desired to operatively connect the grinding mill 30 to the power transmitting means, the operator moves the shaft 17 to the right to disengage it from the splined sleeves 18 and 19 in the manner previously described.

By manipulating the crank handles 44 and 44' to lower the counter shaft 34, the slack in the V belts 33 is taken up, and the shaft 34 is brought into substantial alignment with the universal joint 15 of the power transmitting means.

The auxiliary drive shaft 17' may then be operatively connected between the sleeve 19' and the sleeve 18 by inserting the splined portion 21' into the sleeve 18 and forcing the shaft 17' to the right against the action of spring 26 a sufficient distance to enter the splined portion 20' into the sleeve 19' as aforesaid. The spring 26 holds the shaft 17' against longitudinal sliding movement in the splined sleeves by forcing the shoulder 23' into abutment with sleeve 19', and the engine 12 may then be operated to drive the mill 30.

Hooks 45 may be provided upon one of the side frame members 11, for supporting the shaft 17 when the auxiliary shaft 17' is operatively connected between the grinding mill and the engine, to avoid getting the splines 20 and 21 dirty as by placing the shaft 17 on the ground.

When it is desired to disconnect the mill and connect the power transmitting means to the differential for transporting the vehicle, the auxiliary shaft 17' may be quickly and easily detached from the sleeves 19' and 18, as aforesaid. The counter shaft 34 is then raised out of the way by means of the screws 41 and 41', when the drive shaft 17 may be quickly and easily connected between the sleeves 19 and 18 without the use of tools, in a similar manner to the manner of attachment of the auxiliary shaft 17'.

It has been found in actual practice that the change over from driving the differential for transporting the vehicle to driving the grinding mill, or vice versa, may be effected in a matter of a few seconds without the use of any tools. The apparatus is simple and inexpensive, and practicable in application.

We claim:—

1. In a motor vehicle having power transmitting means, a drive shaft, means for detachably connecting the drive shaft to the power transmitting means, a power driven apparatus having driving connections, means for adjusting the driving connections relative to the power trasmitting means, an auxiliary drive shaft, and coupling means for providing a detachable longitudinally slidable driving connection between one end of the auxiliary shaft and the driving connections and between the other end and the power transmitting means.

2. In a motor vehicle having power transmitting means, a drive shaft, a power driven apparatus having driving connections, means for adjusting the driving connections relative to the power transmitting means, an auxiliary drive shaft, and coupling means for selectively providing a longitudinally slidable driving connection between the drive shaft and the power transmitting means or between the auxiliary drive shaft and the driving connections of the power driven apparatus and the power transmitting means of the vehicle.

3. Power transmission including spaced universal joints, a drive shaft located between the joints, splined coupling means for providing a detachable longitudinally slidable connection between each end of the shaft and one of the universal joints, and a spring for holding the drive shaft against longitudinal movement.

4. In a motor vehicle having a frame and power transmitting means, a drive shaft, coupling means for providing a detachable longitudinally slidable driving connection between the drive shaft and the power transmitting means, spring means for holding the drive shaft against longitudinal movement relative to the power transmitting means, a power driven apparatus mounted on the frame and and having driving connections, means for aligning said driving connections with the power transmitting means, and an auxiliary drive shaft for operatively connecting said driving connections with said power transmitting means.

5. In a motor vehicle having a frame and power transmitting means, a drive shaft, means for operatively connecting the drive shaft to the power transmitting means, a power driven apparatus mounted on the frame and having driving connections, means for aligning said driving connections with the power transmitting means, an auxiliary drive shaft, coupling means for providing a detachable longitudinally slidable driving connection between one end of the auxiliary shaft and the driving connections and between the other end of the auxiliary shaft and the power transmitting means, and spring means for holding the auxiliary shaft against longitudinal movement relative to the power transmitting means.

6. In a motor vehicle having power transmitting means, a drive shaft, a power driven apparatus having driving connections, means for aligning the driving connections with the power transmitting means, an auxiliary drive shaft, coupling means for selectively providing a longitudinally slidable driving connection between the drive shaft and the power transmitting means, or between the auxiliary drive shaft and the driving connections of the driven apparatus and the power transmitting means of the vehicle, and spring means for holding either shaft against longitudinal movement.

7. In a motor vehicle having power transmitting means, a drive shaft, a power driven apparatus having driving connections, an auxiliary drive shaft, and coupling means for selectively providing a longitudinally slidable driving connection between the drive shaft and the power transmitting means or between the auxiliary drive shaft and the driving connections of the power driven apparatus and the power transmitting means of the vehicle.

8. In a motor vehicle having power transmitting means, a drive shaft, a power driven apparatus having driving connections, an auxiliary drive shaft, coupling means for selectively providing a longitudinally slidable driving connection between the drive shaft and the power transmitting means, or between the auxiliary drive shaft and the driving connections of the driven apparatus and the power transmitting means of the vehicle, and spring means for holding either shaft against longitudinal movement.

In testimony that we claim the above, we have hereunto subscribed our names.

WILLIAM M. EVANS.
GRAYDON EVANS.